Patented Apr. 2, 1929.

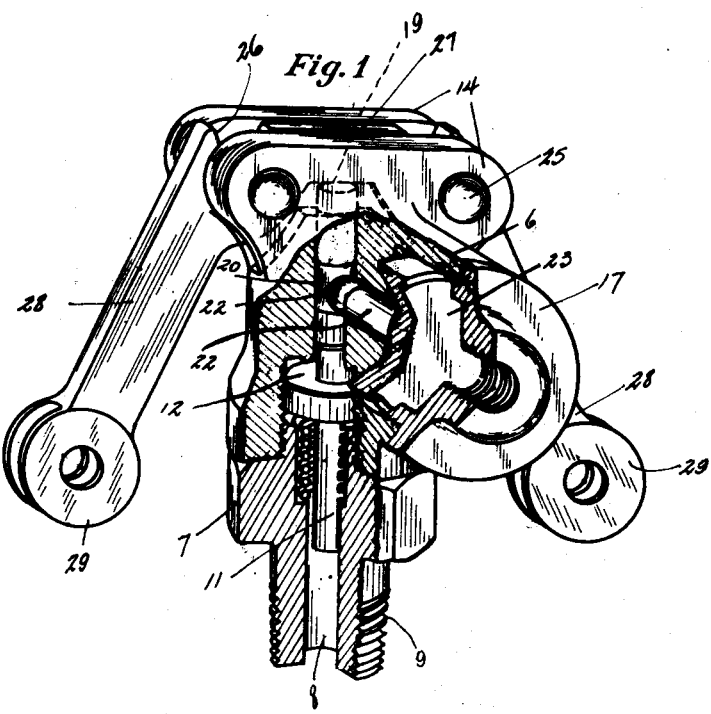
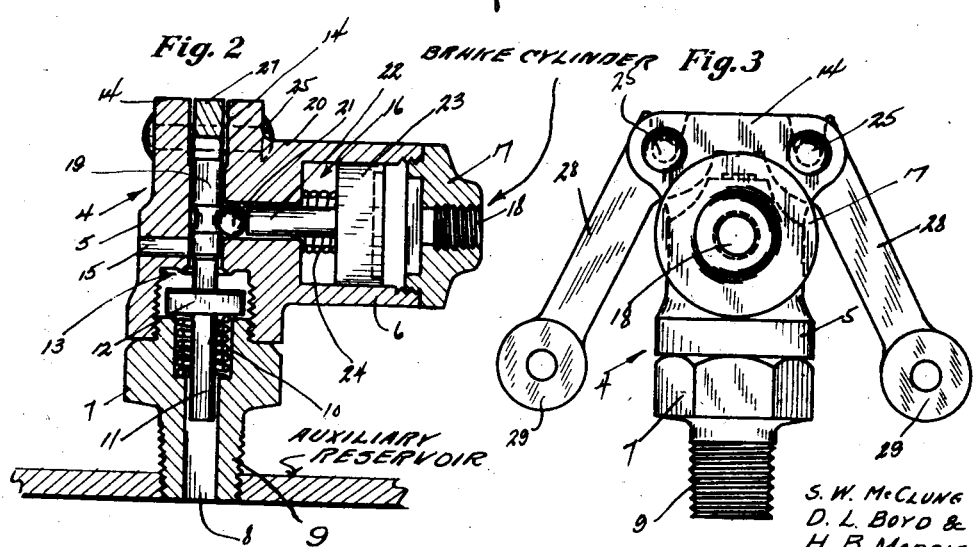

1,707,636

UNITED STATES PATENT OFFICE.

SHANNON W. McCLUNG, DORSEY L. BOYD, AND HARRY B. MORRIS, OF HUNTINGTON, WEST VIRGINIA, ASSIGNORS TO SAMUEL F. NICHOLS, OF CHICAGO, ILLINOIS.

AUTOMATIC BRAKE-RELEASING VALVE.

Application filed August 22, 1927. Serial No. 214,728.

This invention relates to an improved valve which is constructed for association with an auxiliary reservoir and a brake cylinder in a manner to lead air from the reservoir and to thereby release the brakes.

At the present time trains pulling into the receiving yards require the releasing of brakes. When the road engineer cuts away from the train, the brakes on each and every one of the cars throughout the entire train become set and must be released and the reservoirs on each car substantially drained of air, before the yard engines can pull the train from the receiving yard for purposes of classification, etc.

A brake releasing valve or bleed valve is now employed for this purpose, the same being usually tapped into a release support on the auxiliary reservoir, and is manually operated through the medium of levers or rods. Under this arrangement, however, it is necessary for the attendant to stand by and to hold the valves open, while the reservoir is bled in order to release the brakes which were previously set.

The present plan and means for accomplishing the releasing of brakes in the yard consumes much time and requires many employees. Hence, it is believed to be unduly expensive.

Bearing in mind the foregoing, we have evolved and produced a novel brake releasing valve wherein the same is opened by manually manipulated means, but is automatically retained in open position by a novel pneumatic latch and retaining device actuated by air pressure from an adjacent brake cylinder.

The particular structural details for accomplishing the improved result will become more readily apparent from the following description and drawing.

In the drawing:—

Figure 1 is a perspective view in section and elevation showing the improved valve and retaining means therefor.

Figure 2 is a central vertical section through the same, and

Figure 3 is a side elevation looking from right to left in Figure 2.

Referring now to the drawings by reference numerals it will be seen that the numeral 4 designates generally a body made up of right angularly disposed branches 5 and 6, respectively. The branch 5 is formed at its bottom with an internally screw threaded socket into which a fitting 7 is threaded. The fitting is provided with an air passage 8, and a screw threaded nipple 9 is adapted to tap into a screw threaded release port in the auxiliary reservoir (not shown) in the customary manner. The fitting in turn is provided with a socket which accommodates the coil spring 10 surrounding a guide pin 11 formed on the bottom of a disc valve 12. The valve 12 is slidable in the socket in the part 5 and cooperates with a valve seat 13 in the socket as shown in Figure 2. Formed in the part 5 above the socket is the longitudinal bore which opens through the top of the body and between a pair of spaced parallel plate-like portions 14. Leading from one side of the bore is an exhaust or release port 15 in communication with the atmosphere. Leading from the opposite side of the bore above the port 15 is a guide passage which opens into a chamber 16 formed in the branch 6. Incidentally this branch is screw threaded at its outer end and a closing cap 17 is fitted into said end, the cap having a central screw threaded hole 18 with which piping (not shown) is connected. This piping is in turn connected with the brake cylinder (not shown).

Referring again to the valve 12 it will be seen that it carries an upstanding stem 19 which is slidable in said bore. The upper end of the stem extends through and beyond the corresponding end of the bore. The intermediate portion of the stem is formed with an annular groove 20 functioning as a keeper seat. Cooperable with the groove 20 is a retainer ball 21 which is forced into the groove through the medium of a plunger 22. The head 23 of the plunger is slidable in the chamber 16 and a coiled spring 24 surrounds the plunger stem and bears against the head in the manner shown. The spring is of the expansion type and tends to move the plunger in a direction from left to right in Figure 2. However, air coming from the brake cylinder on the opposite side of the plunger through the opening 18 serves to force the plunger in the opposite direction against the tension of the spring and to in turn force the retainer ball 21 into the grooves 20 in the stem 19 for the purpose of holding the valve 12 open. It is desired to broadly refer to the plunger and the retainer ball as a pneumatic latch for maintaining the valve 12 off of the seat 13, in order to permit air to exhaust through the passage 8 and the escape ports 15.

A pair of fulcrum pins 25 are mounted in the aforesaid plates 14 and cooperate with notches 26 in the bight portion 27 of a manually operable yoke. This bight portion is constructed so that the pins 25 extend through the notches while the lower edge thereof engages the upper end of the stem 19. The arms 28 of the yoke are formed at their lower ends with spaced eyes 29 with which operating rods (not shown) are connected. These operating rods are of customary construction as is the yoke. They may be operated from either side of the car. Hence by operating either rod the yoke is rocked about the proper fulcrum pin 25 to force the stem downwardly and to open the valve 12.

The operation of the invention is as follows. Normally, the valve 12 is in firm contact with the valve seat 13, thus closing the passage of air through the discharge port 15. Assuming however, that it is desired to substantially drain the auxiliary reservoir of air with a view toward releasing the brakes, this is done by first manipulating the manually operable yoke. In other words either one of the operating rods are actuated to rock the yoke and to force the valve 12 down against the tension of the spring 10. As the stem 19 moves downwardly, owing to the action of the yoke, the groove 20 is alined with the ball 21. Since the branch 6 is connected through piping with the brake cylinder, the back pressure in the brake cylinder serves to force the plunger in a manner to press the ball firmly into the groove and to thereby hold the valve 12 open for a certain length of time until most of the air has been drained or bled from the reservoir. Thus, we have a spring closed valve which is forced downwardly against the action of the spring through the medium of a manually manipulated yoke. This valve being provided with a grooved stem held down through the action of an air actuated retaining device or latch.

From the foregoing description and drawings it will be seen that we have produced an exceptionally simple and inexpensive valve contrivance which can be included in the customary railway brake equipment without requiring extensive alterations of the existing details. The device is positive because the valve is first opened by manual means and this is dependable because the attendent can determine if the valve happened to be sticking. In other entirely automatic devices the valve sometimes sticks and it is difficult to determine whether the valve is open or closed. With this arrangement, however, the attendant comes along to each car and makes sure that the valve is open and then immediately releases the operating rod whereby the pneumatic latch comes into play and thereby holds the valve open until substantially all the air is drained whereupon the spring means returns the parts to their normal relationship. This obviates the necessity of employing a makeshift chock such as is frequently employed for holding the valve open.

Persons familiar with inventions of this class will doubtless be able to obtain a clear understanding of the construction and advantages of the same, therefore a more lengthy description is thought unnecessary.

Minor changes in shape, size, and arrangement of parts coming within the field of invention claimed may be resorted to if desired.

Having thus described the invention, what we claim as new is:—

1. In a brake releasing valve of the class described, a body having means for connection to the bleed port in an auxiliary reservoir, said body having an air release passage provided with a discharge port in communication with the atmosphere, a closing valve in said passage for closing said port, manually operable means for opening the valve, and a pneumatic latch and retainer for holding the valve open for a predetermined length of time to allow air to be bled through said discharge port.

2. In a brake releasing device of the class described, a bored body having an air discharge port in communication with the bore, said body adapted to be mounted upon an auxiliary reservoir, there being a valve seat formed in the body in alinement with said bore, a spring closed valve cooperable with said seat, said valve having a stem slidable in said bore, a manually manipulated operating device mounted on the body and engageable with said stem for unseating the valve against the tension of said spring, and an automatically operable pneumatic latch and retaining device carried by said body and cooperable with said stem for holding said valve unseated for a predetermined length of time.

3. In a brake releasing device of the class described, a bored body having a release port in communication with the bore on one side, and a guide passage in communication with the bore on the opposite side and having a valve seat at the lower end of said bore, a fitting carried by the body and adapted for connection with an auxiliary reservoir, a spring pressed valve associated with the body and fitting and cooperable with said valve seat, said valve having a stem slidable in said bore, said stem extending through the upper end of the bore and being provided with an intermediate annular groove forming a keeper seat, a ball located in said guide passage and cooperable with said seat, a fluid actuated plunger mounted on the body and engageable with said ball for forcing the latter into said groove to retain the valve unseated, and a manually manipulated yoke mounted on the body and engageable with the upper end of said stem.

In testimony whereof we affix our signatures.

SHANNON W. McCLUNG.
DORSEY L. BOYD.
HARRY B. MORRIS.